Nov. 22, 1960
J. P. BARRETT
2,961,030
VAPOR BARRIER FOR COLD SURFACES
Filed March 15, 1957
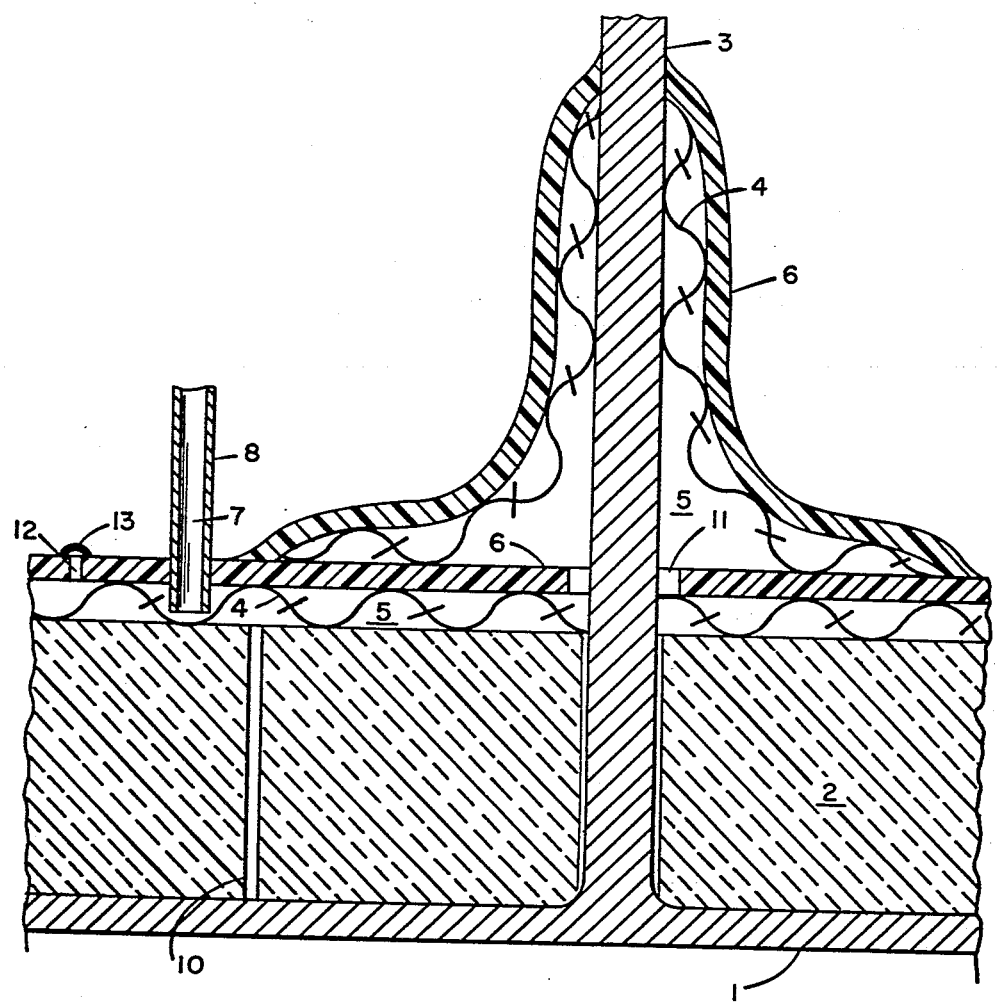
INVENTOR.
JACK P. BARRETT
BY *Buell B. Hamilton*
ATTORNEY

United States Patent Office 2,961,030
Patented Nov. 22, 1960

2,961,030

VAPOR BARRIER FOR COLD SURFACES

Jack P. Barrett, Tulsa, Okla., assignor to Pan American Petroleum Corporation, Tulsa, Okla., a corporation of Delaware Filed Mar. 15, 1957, Ser. No. 646,191

5 Claims. (Cl. 154—28)

This invention relates to a coating for thermal insulation applied to cold surfaces. More particularly, it relates to the use of a vapor barrier for preventing condensation of liquids in insulation on cold surfaces.

It is customary to insulate hot surfaces to avoid loss of excessive quantities of heat. It is even more important to insulate surfaces colder than atmospheric temperature since refrigeration costs are generally greater. In modern industry much refrigeration is used. For example, deethanizer columns in petroleum refineries or natural gasoline plants are normally much colder than atmospheric temperature and hence require extensive insulation. Extreme examples of cold surfaces exist in plants for manufacturing liquid oxygen from air where operation cannot proceed without efficient insulation. It is not enough to apply insulation to such surfaces. The insulation must be maintained at its maximum efficiency. This is difficult if the cold surface temperature is below the dew point of air in contact with the insulation. In such cases, water condenses from the air and slowly fills the insulation. Insulation in this condition is not efficient. It becomes imperative therefore to prevent entry of wet air into the insulation.

Insulation of the type contemplated is usually covered by a relatively waterproof coating of asphalt, a metal or plastic sheet, or some similar protective layer. Such materials offer some resistance to penetration of wet air into the insulation. However, the joints in metallic coating for insulation are rarely air-tight. A cold-applied coating of plastic such as epoxy or polyester resins can be made initially air-tight but expansion and contraction of protected metal surfaces soon cracks the plastic. Asphaltic coatings, at least when they are new, are substantially impervious to air. After a short period of use, however, the asphaltic coatings become hard and brittle. Expansion and contraction of the surface as it is cooled and allowed to warm again, then cracks the hard asphaltic coating permitting wet air to enter the insulation. The problem is particularly serious around metal structural members extending through the insulation to support reflux drums, instruments, ladders, and the like. Not only do such members tend to pull loose from the asphalt or plastic coatings when cold, but it is very difficult or impossible to form an air-tight seal around such structural members in the first place if the metal surfaces are at all oily or wet.

A partial solution has been to introduce dry gas, such as nitrogen, under the coating to maintain a small pressure of two or three ounces per square inch above atmospheric pressure. Gas then flows out from under the coating so little wet air can enter. For overlapping metal sheet coatings gas losses are excessive. Even if joints are soldered or welded some holes and cracks occur, particularly around structural members. Gas pressure under newly applied asphalt coatings causes bubbles and blisters to form which break and leave large holes for the escape of dry gas. Asphalt coatings soon become dry enough not to blister but they quickly harden and become so brittle that they crack and permit gas to escape.

With the above problems in mind, an object of this invention is to provide a means for preventing vapors such as wet air from penetrating insulation over a cold surface with consequent condensation of components of the vapor on the cold surface. A more specific object of this invention is to provide a covering for insulation over cold surfaces, this covering serving as an effective barrier to vapors such as wet air, from which a component will condense on the cold surface. A still more specific object is to provide such a covering which will maintain its vapor impermeability even when the cold surface changes through a wide temperature range as when a refinery shuts down on starts up. Another specific object of the invention is to provide a covering in which any cracks which may form are automatically sealed. That is, the covering is self-sealing. Other objects will occur to those skilled in the art from the following description.

In general, I have found that the objects of my invention can be attained by using the covering described in my co-pending United States patent application S.N. 451,264, filed on August 20, 1954, now abandoned. That application teaches the use of a normally viscous coal tar pitch derivative supported by a fiber mat and covered by an outer protective sheet for protecting surfaces exposed to marine conditions.

As applied to forming vapor barriers over insulation covering cold surfaces, the coal tar pitch derivative, fiber mat support and outer protective sheet are also necessary. In addition, dry gas should be injected below the composite covering to maintain a pressure of a few ounces per square inch above atmospheric pressure. This pressure causes flow of the coal tar derivative to occur into and through cracks or holes in the outer protective casing. If asphaltic materials or greases are used in place of the coal tar pitch derivative, flow continues until all the available liquid material is displaced. Then gas blows freely through the crack or hole. The coal tar pitch derivatives, however, have a unique skinning ability. That is, when these derivatives are exposed to air a skin rapidly forms over the surface of the pitch. This skin has considerable strength. The strength is sufficient to stop the flow of the coal tar derivative through small cracks and holes under a few ounces of pressure. The overall result is that the sealing material is forced to flow out of holes and cracks in the outer sheet until it reaches the air. Then a skin forms which resists further flow. Thus the crack or hole is sealed.

The skinning ability of coal tar was checked by the following test. Three disks about 1-inch in diameter were cut from a sheet of polyester resin plastic. The sheet was about $\frac{1}{16}$-inch thick and was reinforced with a glass fiber mat. One disk was crazed or cracked by striking it with a hammer. A hole $\frac{1}{64}$-inch in diameter was drilled through the second disk and a hole $\frac{1}{32}$-inch in diameter was bored through the other. These disks were sealed in holders by means of O-rings so gas pressure could be applied to one side. The crazed disk had a leak rate of 0.25 cubic feet per hour at a differential pressure of 1 pound per square inch across the disk. Leak rates of the other disks were not measured. A fiber glass mat and about a $\frac{1}{8}$-inch thick layer of Tarmastic 106, a coal tar pitch derivative, were then applied to the high pressure side of each disk. The gas pressure caused the coal tar pitch derivative to penetrate the fine cracks of the crazed sheet and the holes in the other disks and appear on the low pressure surface of the disks. At differential pressures less than about 8 ounces per square inch, flow stopped after a short time as a skin formed over the coal tar pitch derivative exposed on the low pressure surface of the disks. At a differential pressure of 1 pound per square inch the skin was unable to stop flow through the 1/32-inch hole. The crazed disk and the one with the 1/64-inch hole, however, remained sealed even when a differential pressure of 5 pounds per square inch was applied.

These tests demonstrate two points. First, the coal tar pitch derivative flowed under a small differential pressure to seal cracks and holes in the plastic disks. Second, a skin formed rapidly over the coal tar pitch derivative which extruded through the cracks and holes. This skin was able to stop flow of the derivative through holes up to 1/32 inch in diameter at a differential pressure up to 8 ounces per square inch. By using smaller differential pressures such as about 2 ounces per square inch, it will be apparent that the skin will stop flow through even larger holes and cracks.

Another important property of the skin which forms over coal tar pitch derivatives is its extremely impermeable nature. As a result of this impermeability the derivative remains soft and pliable under the skin for many months. It is thus able to flow through any cracks or holes which may develop in the outer protective casing and seal these openings. It is not known whether the skinning action is due principally to evaporation of light oils or to reaction of coal tar pitch ingredients with air. Some photochemical reactions may even occur. The highly impermeable skin prevents both evaporation and reaction with air, to maintain the coal tar pitch derivative soft and pliable.

A comparison of the hardening tendency of a petroleum asphaltic coating material suitable for use over insulation and of the Tarmastic 106 coal tar pitch derivative was made by spreading 1/8-inch thick layers of the two materials on steel sheets. Areas of about 4 x 8 inches were covered. The two coatings were of similar appearance, softness and plasticity immediately after application. After a period of 3 weeks exposure to air at a fairly uniform temperature of about 75 to 80° F. both samples were again examined. The asphaltic coating had hardened to such a degree that it could be cut by a knife only with difficulty. The coal tar pitch derivative, on the other hand, was almost indistinguishable in softness and plasticity from a newly applied coat except that a definite skin had formed. The skin was sufficiently firm to permit touching of the surface by the fingers without adherence of the pitch to the fingers.

A narrow groove was formed in the asphaltic coating with a knife. A broad groove was formed in the coal tar pitch derivative using a spatula about 1/8 inch wide having a rounded tip. Lacquered, regenerated cellulose (cellophane) sheets were placed over the two grooves. A circular weight, 3½ inches in diameter and weighing about 540 grams was then placed over each groove. The asphaltic coating deformed only slightly even after an hour. The narrow groove was still present in the asphalt. The coal tar pitch derivative, on the other hand, deformed readily. The broad groove was completely sealed in less than two minutes. The weights exerted a pressure of about 2 ounces per square inch on the coatings. Thus, it is apparent that if a pressure about 2 ounces per square inch above atmospheric pressure is maintained under my vapor barrier the coal tar pitch derivative will flow rapidly to seal any cracks and holes which may occur even after the coating has been applied for many weeks. Asphaltic coatings, however, harden too much to flow after only 3 weeks.

At temperatures below about 0° F., even the coal tar pitch derivatives become stiff and lose much of their plasticity. For most of the covering this stiffening tendency is not serious since there is a layer of insulation between the coal tar pitch derivative and the cool surface. The pitch derivative is, therefore, close to atmospheric temperature. This derivative on structural members extending through the insulation, however, is directly in contact with the metal. The solidification of the pitch derivative on and near the metal is not serious. A short distance from the cold metal, the temperature is sufficiently high to permit flow of the coal tar pitch derivative. It is important, however, that the material should adhere to the cold metal.

To determine the ability of the derivative to adhere to metal at cold temperatures a 22 gauge sheet of steel 4 inches by 8 inches was coated to a depth of about 1/8 inch with Tarmastic 106. The metal and coating were cooled to below 0° F. The cooled panel was then bent down over a 3/4 inch rod with the coal tar pitch derivative on the top side. Bending was continued until the ends of the panel were parallel below the rod. The pitch derivative was sufficiently stiff so that it cracked. There was no evidence of parting from the metal surface, however. Since the pitch derivative did not disbond under this extreme test it will be apparent that it will remain bonded to metal under service conditions.

One other property of coal tar pitch derivatives is unique and important. This is the ability of these materials to wet metals even though the metal surfaces may be covered with oil, water, or scale. That is, the coal tar pitch derivatives will penetrate scale or films of water or oil and will wet and adhere tightly to the metal surface. This wetting ability is due to the presence of coal tar acids and bases (wetting oils). The adherence is due in part to the wetting action of the coal tar acids and bases and in part to the tacky nature of coal tar pitch.

The degree of the ability of coal tar pitch derivative to wet metals depends, of course, upon the concentration of the wetting oils. The ability to adhere to metals depends principally on the concentration not only of wetting oils but of coal tar pitch. The skinning tendency of coal tar pitch derivatives depends principally upon the concentration of coal tar pitch. To provide adequate skinning tendency and adhering ability, the coal tar pitch derivative should contain at least about 40 percent by weight of coal tar pitch boiling above about 350° C. If the derivative is to remain sufficiently soft and pliable for my purposes, the quantity of coal tar pitch should not exceed about 80 percent by weight. The remaining 20 to 60 percent of the coal tar pitch derivative should consist principally of oils boiling below about 350° C. Preferably, these should be the higher boiling oils such as middle oil, creosote, or anthracene oil. If coal tar fractions gathered from all parts of a coal tar gathering system are blended together, the resulting material will generally fall within this range for pitch and oils. Thus, many natural coal tars meet my requirements for coal tar pitch derivatives.

Most natural coal tars also contain sufficient wetting oils boiling below 350° C. for my purposes. The coal tar pitch derivatives should contain at least about 3 or 4 percent by weight of such wetting oils based on total coal tar derivative weight. These wetting oils may consist of coal tar acids, bases, or both. Preferably, at least about 5 percent by weight of wetting oils should be present. The presence of sufficient wetting oils can be easily determined by wetting one piece of steel with water and another with hydrocarbon oil and determining if the coal tar pitch derivative in question will wet and adhere to the surfaces of the films of water and oil. If the particular coal tar pitch derivative will not wet and adhere to the surfaces, additional coal tar acids or bases should be mixed into the composition.

In addition to the pitch, wetting oils and viscosity reducing oils, the coal tar pitch derivative may contain solids. These may be the benzol insoluble carbon normally present in coal tar in amounts between about 1 and 15 percent of the volume of the coal tar. Short fibers of asbestos are often added to coal tar to decrease its tendency to flow. Fibers of other materials such as glass, may also be used. Fibers added to the body of the coal tar derivative should be less than about an inch in length and preferably much shorter. Powdered solids such as coal dust, silica flour, fine mica, clay, or ground oyster shells, may also be added to increase the viscosity and gel strength of the pitch derivative. Normally, not more than about 5 percent by weight of extraneous solids such as asbestos fibers will be required. For some of the more fluid derivatives as much as about 20 percent solids may be added. The solids content of the coal tar pitch derivatives may amount to even more than about 20 percent by weight in some cases.

From the above description it will be apparent that the term "coal tar pitch derivative" is intended to indicate a purely physical derivative and not a chemical derivative. As explained above, many coal tars themselves are suitable for my purposes but some are not. The term "coal tar pitch derivative" as used herein, therefore, is intended to indicate coal tars suitable for my purposes as well as coal tars which have been modified by addition or subtraction of normal coal tar ingredients or inert additives to produce suitable materials.

The purpose of the fiber mat is to support the outer protective casing and provide a porous space between the insulation and outer casing to contain the coal tar pitch derivative. The mat also serves to inhibit flow of the coal tar pitch derivative due to the force of gravity, the force of pressure beneath the covering, and the pressure exerted when the outer casing is banded or otherwise fastened around the insulation.

The term "fiber mat," when used herein, means a mat of fibers which are interlaced or have been bonded together by fusion or by spraying with an adhesive such as synthetic resin to form a cohesive mat with sufficient tensile strength to be handled as a sheet. The fibers may be of either organic nature such as horsehair or synthetic resins, or of a mineral nature such as asbestos, rock wool, or glass. However, since some organic materials are somewhat susceptible to decomposition, the mineral fibers are preferred for use in my protective coating. Resin bonded glass mats or woven glass fabrics are greatly preferred because of their inertness, the strength of the mats and the low cost. The finer fibers, if sufficiently intermeshed or bonded together, are almost as strong under compression as the coarser ones and are much more effective than the coarser fibers in inhibiting flow of the coal tar pitch derivative. Therefore, fibers of an average diameter less than about 0.01 inch should be used, while those less than about 0.001 inch are generally preferred. These individual fibers may be, and preferably are, spun into larger threads before being bonded or woven to produce the desired mat.

The thickness of the fiber mat and of the coal tar pitch derivative layer filling the mat should be at least about 1/16-inch. This provides sufficient coal tar derivative to flow into cracks and holes which may develop in the outer protective casing. Preferably the mat and filling should be about 1/8-inch in thickness. A filled mat over 1/4-inch thick will seldom be justifiable but may be used, if desired.

The mat and coal tar pitch derivative may be applied in several ways to the insulated surface. The mat may first be impregnated or filled with the coal tar pitch derivative. The filled mat can then be applied as a unit. However, this method of application is inconvenient unless the mat is attached to an impermeable sheet of plastic, metal, or the like. When the mat and coal tar pitch derivative are to be applied over a dry insulation such as 85 percent magnesia, it may be difficult to apply the derivative first and then press the mat into place. Even if the coal tar pitch derivative sticks to the surface of 85 percent magnesia, this surface may break away from the body of the insulation and be dragged along by the trowel or other means used for applying the pitch derivative. Therefore, it is usually more convenient to tie or otherwise fasten the fiber mat over the insulation and then apply the coal tar pitch derivative to the mat. As the pitch derivative is applied it should, of course, be pressed into, and preferably through, the mat. The protective casing can then be applied over the filled mat. As explained later, the preferred method of application is to attach the fiber mat to a plastic sheet, fill the mat with coal tar pitch derivative, and apply the protective sheet, the mat and the derivative at the same time.

The covering over the insulation may be allowed to make right angle joints with the structural members extending through the insulation. Such joints, however, are not generally sufficiently secure for my purposes. I prefer to form a sleeve around each structural member and join this sleeve with the main covering over the insulation. The sleeve may be formed by tying fiber mat around the structural member and pressing the coal tar pitch derivative through the mat until it contacts the metal surface of the structural member. A perfect seal may be difficult to obtain by this method, however. It is preferred to apply the coal tar pitch derivative first directly to the metal surface of the structural member. The fiber mat is then pressed into the pitch derivative. The glass mat should flare out over the main covering of the insulation. The flared mat on the structural member may be either under or on top of the main covering. This flared mat can then be covered with a suitable outer protective casing such as a rubber sleeve flared over the main insulation covering. A preferred means for protecting the sleeves on structural members is to apply a liquid cold-setting polyester or epoxy resin which then sets to form a strong outer casing.

Uninsulated conduits extending out from insulated surfaces are treated as structural members. Insulated conduits are, of course, covered with my vapor barrier. Joints between large insulated surfaces and conduits, or between two or more conduits, may be covered by sheets preformed to fit the joints, or by applying liquid cold-setting resins over the fiber mats tied around the joints and filled with coal tar pitch derivatives.

As previously noted, the coal tars containing wetting oils will wet metal surfaces covered by scale, water, oil, or the like. There are limits, however, to what even the coal tars can do. If structural members are covered with considerable amounts of dirt, loose scale, or thick layers of grease, it is best to remove most of such materials by brushing, wiping, washing, or the like. It is not necessary, however, to resort to extreme surface preparing techniques such as solvent washing, shot blasting, primer coating, and the like, before the coal tar pitch derivative is applied.

The outer protective casing for the main covering of the insulation may consist of a cold-setting epoxy or polyester coating brushed, or preferably sprayed, over the surface. It may also be formed by overlapped sheets of plastic, aluminum, rubber, or the like. One point should be noted. When the protected metal surface becomes cold, it contracts. This draws together structural members, conduits, and the like. If a perfectly rigid protective casing is used, and the temperature drop of the protected surface is great, the rigid coating may be cracked and shattered. Therefore, a rigid coating should include at least one overlapped joint where movement can occur between structural members spaced more than about 2 feet apart. Alternatively, the rigid casing may be applied only to either the covering of the structural members, conduits, and the like, or to the principal surface, leaving holes around the structural members. The portion remaining unprotected in either case can then be covered by a flexible coating such as rubber, polyethylene, or the like, which can absorb the movement. Of course, the entire surface may be covered by a flexible coating, if desired.

A preferred form of combined protective casing, mat and coal tar derivative was prepared as follows: A glass fiber mat was laid out over a sheet of lacquered, regenerated cellulose (cellophane). A liquid polyester resin was spread over the glass fiber and pressed into the mat. When the polyester had set, the mat and plastic were turned over and a thin layer of polyester resin was applied to the opposite side to fill the remainder of the glass mat and form a reinforced sheet about 1/16-inch thick. This thin layer of resin also served to hold a second glass mat about 1/16-inch thick which was laid over the thin layer of resin and pressed very lightly into the resin before it set. In this way the outer plastic casing for the protective coating and the glass mat to be filled with a coal tar pitch derivative were attached together in a form which permitted handling them together as a unit. It will be apparent that such a unit can be prepared by binding one side of a glass mat to a plastic sheet by other means.

In my preferred method of applying a vapor barrier over insulation, sheets of combined outer casing and mat are prepared as described above. Flat sheets are sufficiently flexible to be bent around pipes and vessels larger than about 2 feet in diameter. For smaller diameter pipes the sheets should be prepared in tubular form and split down one side. When the sheets are ready, the mat attached to one side of each sheet is filled with coal tar pitch derivative. The sheets are then attached to the insulated surface with the filled mat on the inside against the insulation. Fastening may be by any suitable means such as banding every 1 or 2 feet, stud-welding, or the like. Use of studs may be necessary to hold the covering on some surfaces such as the lower surfaces of large vertical columns. They should be avoided where possible, however, to eliminate heat transfer through these studs. The sheets are overlapped by at least one inch with glass mat and coal tar pitch derivative preferably in the overlap to form a seal. Overlapped joints are also preferably provided between structural members or conduits more than about 2 or 3 feet apart if the cold surface is to be cooled very much below 0° F. In addition, and particularly if such joints are not provided, holes are formed or cut in the sheets around structural members, leaving a clearance of from about 1 to 6 inches.

The structural members are then cleaned by brushing, washing, or wiping. Coal tar pitch derivative is applied to a length of the structural member extending outside the insulation. A sleeve of fiber glass mat is pressed into this layer of pitch derivative. The mat is flared out over the plastic sheet covering the insulation and is filled with coal tar pitch derivative. Cold-setting epoxy or polyester resin then applied to the flared glass mat sleeve to protect it. After the cold-setting resin has solidified, dry nitrogen is introduced into the space below the entire covering. A regulator maintains the nitrogen pressure at about 2 ounces per square inch above atmospheric pressure.

In the drawing a cold metal wall 1 is shown covered by a layer of insulation 2. A structural member 3 is shown extending through the layer of insulation. A layer of glass fabric 4 filled with a viscous coal tar pitch derivative 5 covers the insulation. The coal tar pitch derivative and glass fabric are protected by an outer plastic jacket 6 which is impervious to the coal tar pitch derivative. A dry gas 7 is injected under the layer of glass fabric and coal tar pitch derivative through tube 8. This gas passes through the porous insulating material and through joints such as 10 in the insulation. The result is an almost uniform application of pressure along the underside of the coal tar pitch derivative. The gas cannot flow along structural member 3 since the coal tar pitch derivative adheres strongly to the metal surface. The pressure is applied to the viscous material, however, through opening 11. Thus, if a crack develops in the outer plastic sleeve around the structural member, coal tar pitch derivative flows through the crack under the force of the gas pressure to seal the crack. Such a crack in the outer protective covering is shown at 12. When such a hole or crack occurs, coal tar pitch derivative flows through the opening to form a button 13 on the outside of the protective covering. An outer tough skin rapidly forms on the surface of the button to restrain further flow of the coal tar pitch derivative through the hole. It will be apparent that the proposed covering for insulation provides a self-healing seal to prevent contact of the insulation or cold metal surface with moist air.

I claim:

1. A method for preventing condensation of liquid from a gaseous mixture containing vapors thereof in thermal insulation applied over surfaces colder than dewpoint of said gaseous mixture surrounding the insulated surface comprising applying over said insulation a fiber mat covering containing a normally viscous coal tar pitch derivative, said mat being protected by an outer casing impervious to said derivative, and introducing between the cold surface and said covering a gas having a dewpoint below the temperature of said surface, the pressure of said gas being sufficient to cause said derivative to fill any perforations in said cover but insufficient to prevent the formation of a tough skin or film on the surface of said derivative penetrating and extending to the exposed surface of said casing, said viscous coal tar pitch derivative containing from about 40 to about 80 percent by weight of coal tar pitch boiling above about 350° C. and about 20 to about 60 percent by weight of coal tar oils boiling below about 350° C., at least about 3 precent by weight of said pitch derivative being acidic and basic oils which act as wetting agents.

2. The method of claim 1 in which said fiber mat is composed of glass fibers.

3. The method of claim 1 in which said outer casing is made up of sheets of polyester resin.

4. The method of claim 1 in which said pressure of said gas under said covering is maintained between about 1 and about 8 ounces per square inch above the pressure outside said covering.

5. A method for preventing condensation of water in insulation over surfaces colder than the dewpoint of wet air surrounding the insulated surface, comprising applying over said insulation a covering of fiber mat filled with a normally viscous coal tar pitch derivative, and protected by an outer casing impervious to said coal tar pitch derivative, and introducing under said covering a gas having a dewpoint below the temperature of the cold surface, and maintaining the pressure of said gas under said covering above the pressure outside said covering, but insufficient to cause continuous flow of said coal tar pitch derivative through holes and cracks in said outer casing, said viscous coal tar pitch derivative containing from about 40 to about 80 percent by weight of coal tar pitch boiling above about 350° C. and about 20 to about 60 percent by weight of coal tar oils boiling below about 350° C. at least about 3 percent by weight of said pitch derivative being acidic and basic oils which act as wetting agents.

References Cited in the file of this patent

UNITED STATES PATENTS

| | | |
|---|---|---|
| 2,000,882 | Comstock | May 7, 1935 |
| 2,082,175 | Sutherland | June 1, 1937 |
| 2,164,143 | Munters | June 27, 1939 |
| 2,184,316 | Plummer | Dec. 26, 1939 |
| 2,189,388 | Zand | Feb. 6, 1940 |
| 2,343,601 | Weimann | Mar. 7, 1944 |
| 2,540,331 | Hlavaty | Feb. 6, 1951 |
| 2,718,479 | Bierly | Sept. 20, 1955 |
| 2,779,066 | Gaugler et al. | Jan. 27, 1957 |
| 2,817,124 | Dybvig | Dec. 24, 1957 |